May 30, 1950
C. G. PULLIN
HELICOPTER
2,509,313
Filed May 20, 1944
10 Sheets-Sheet 1
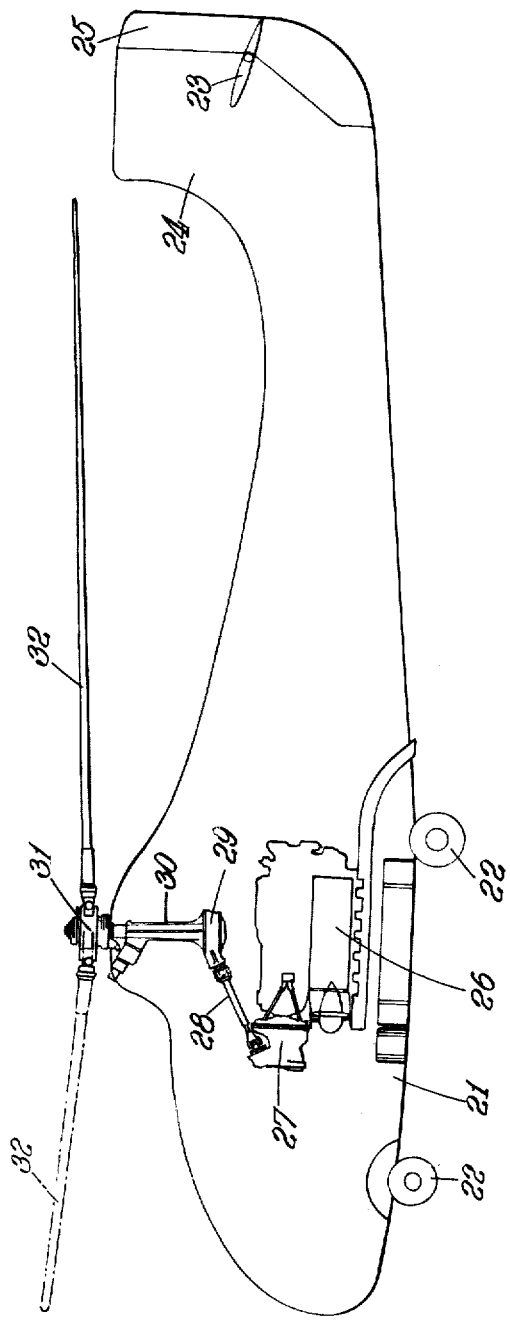

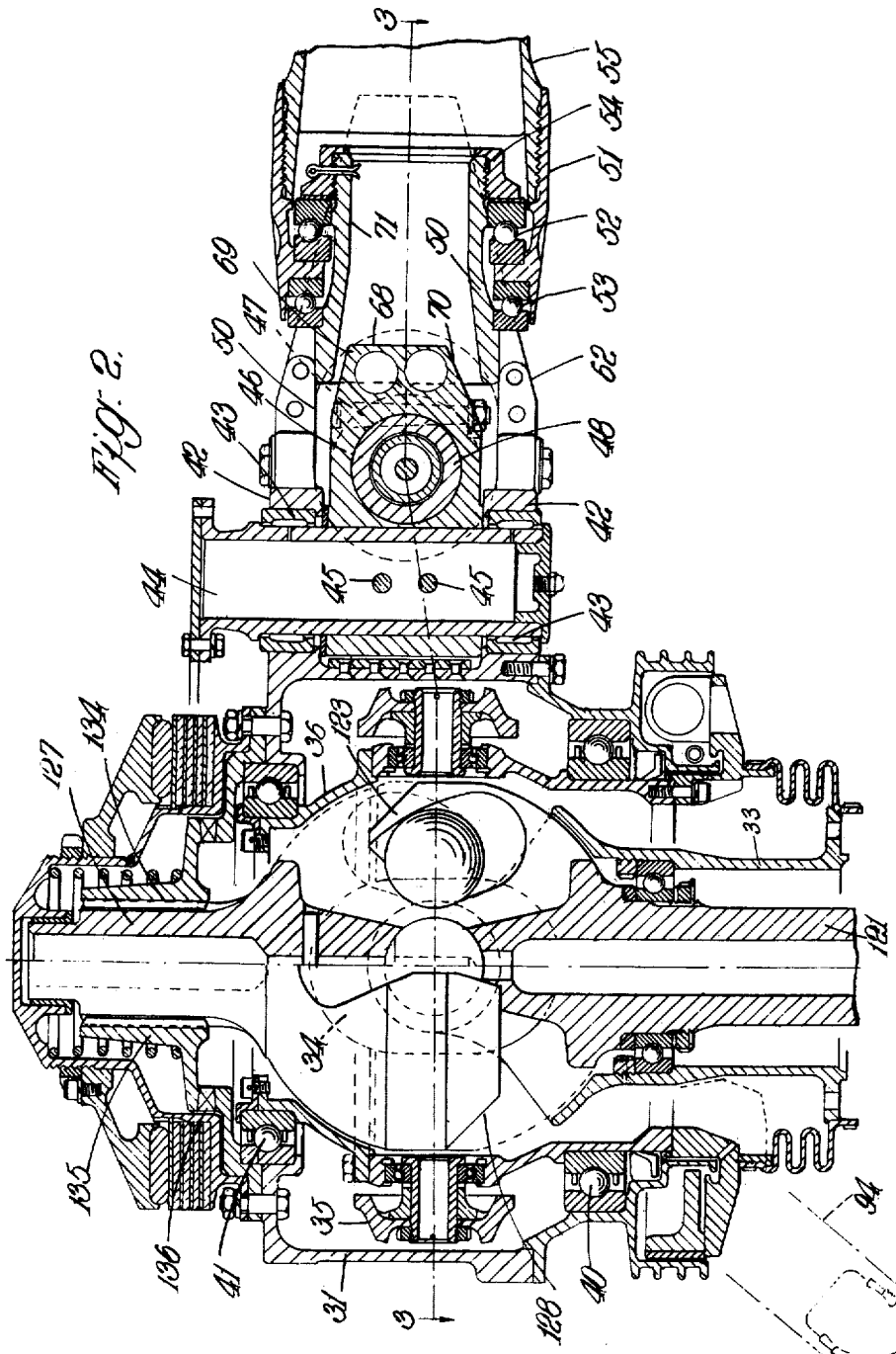

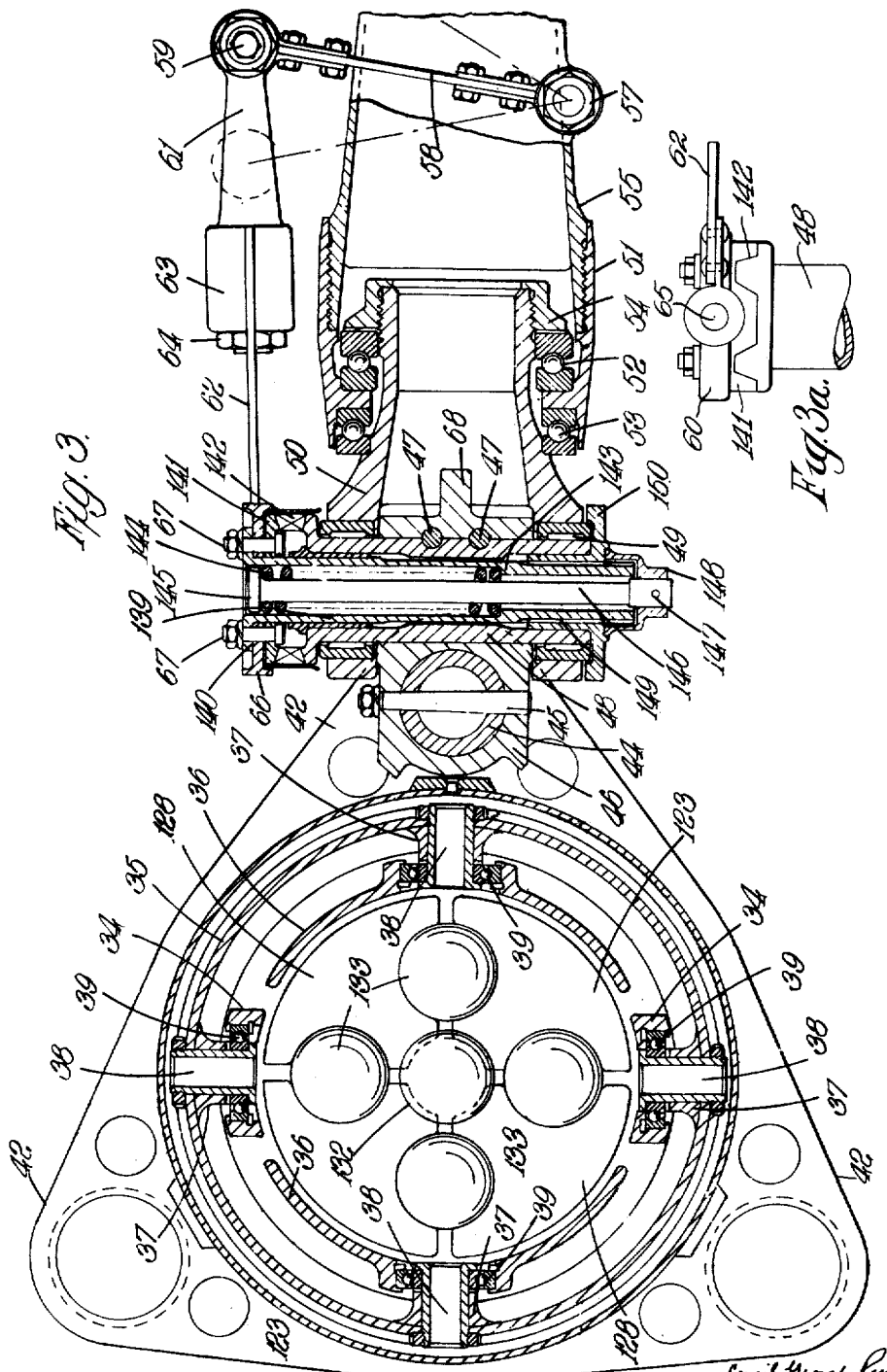

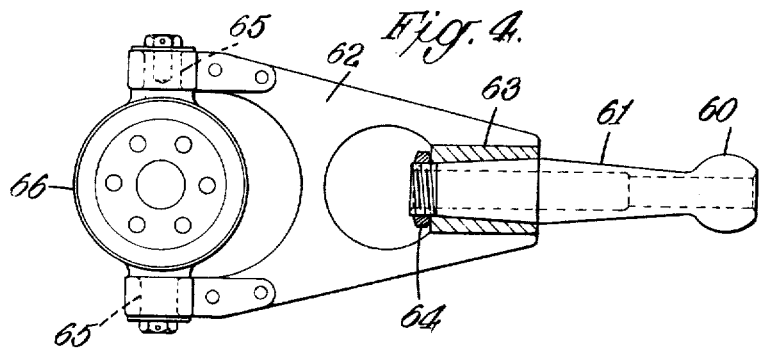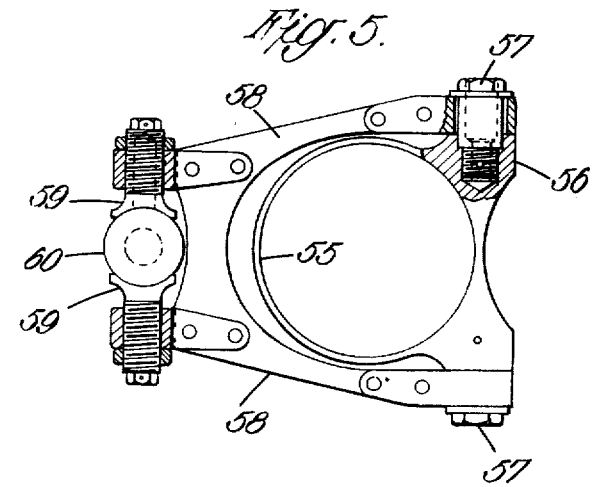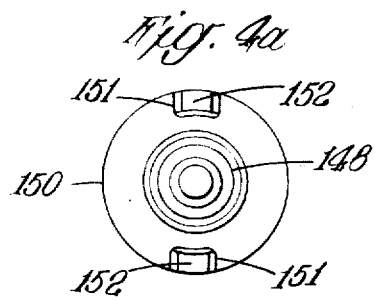

May 30, 1950 C. G. PULLIN 2,509,313
HELICOPTER
Filed May 20, 1944 10 Sheets-Sheet 5
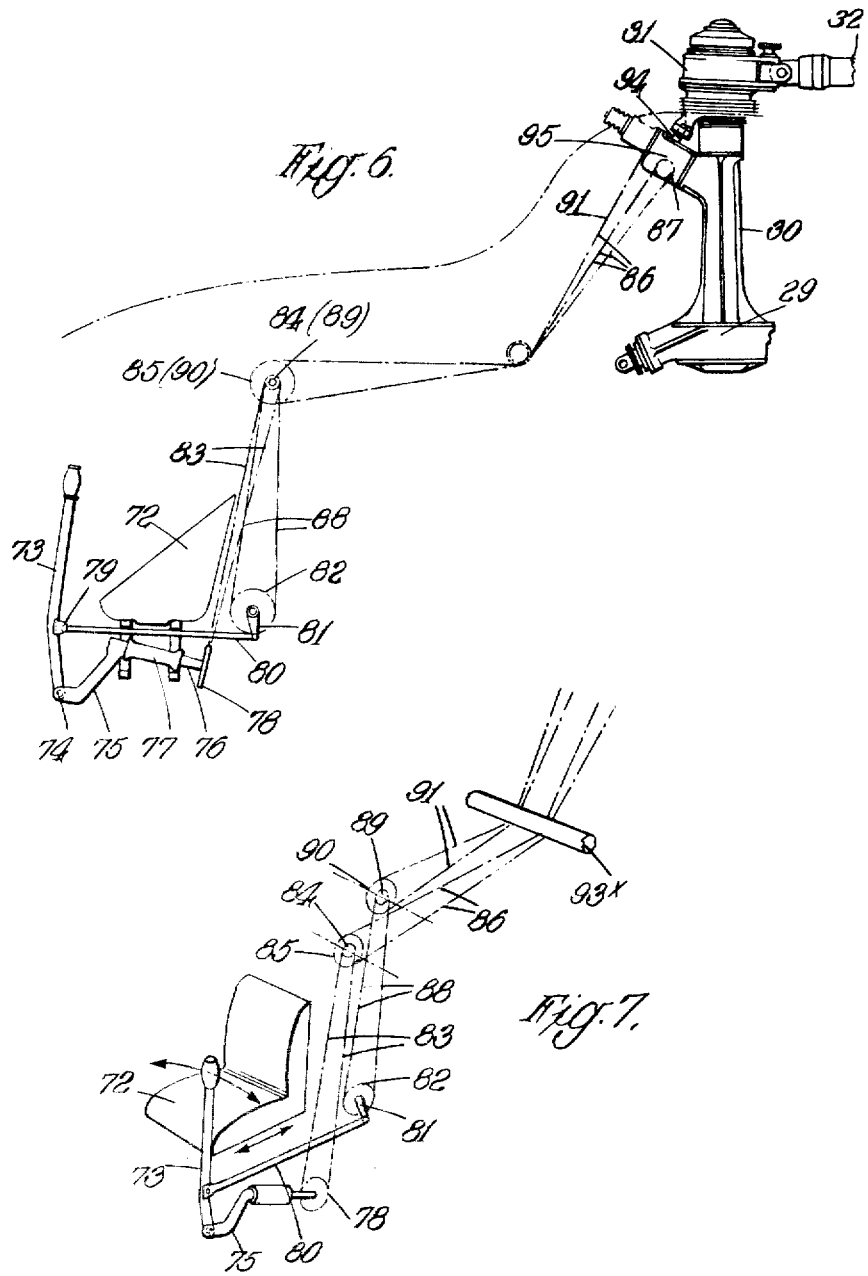

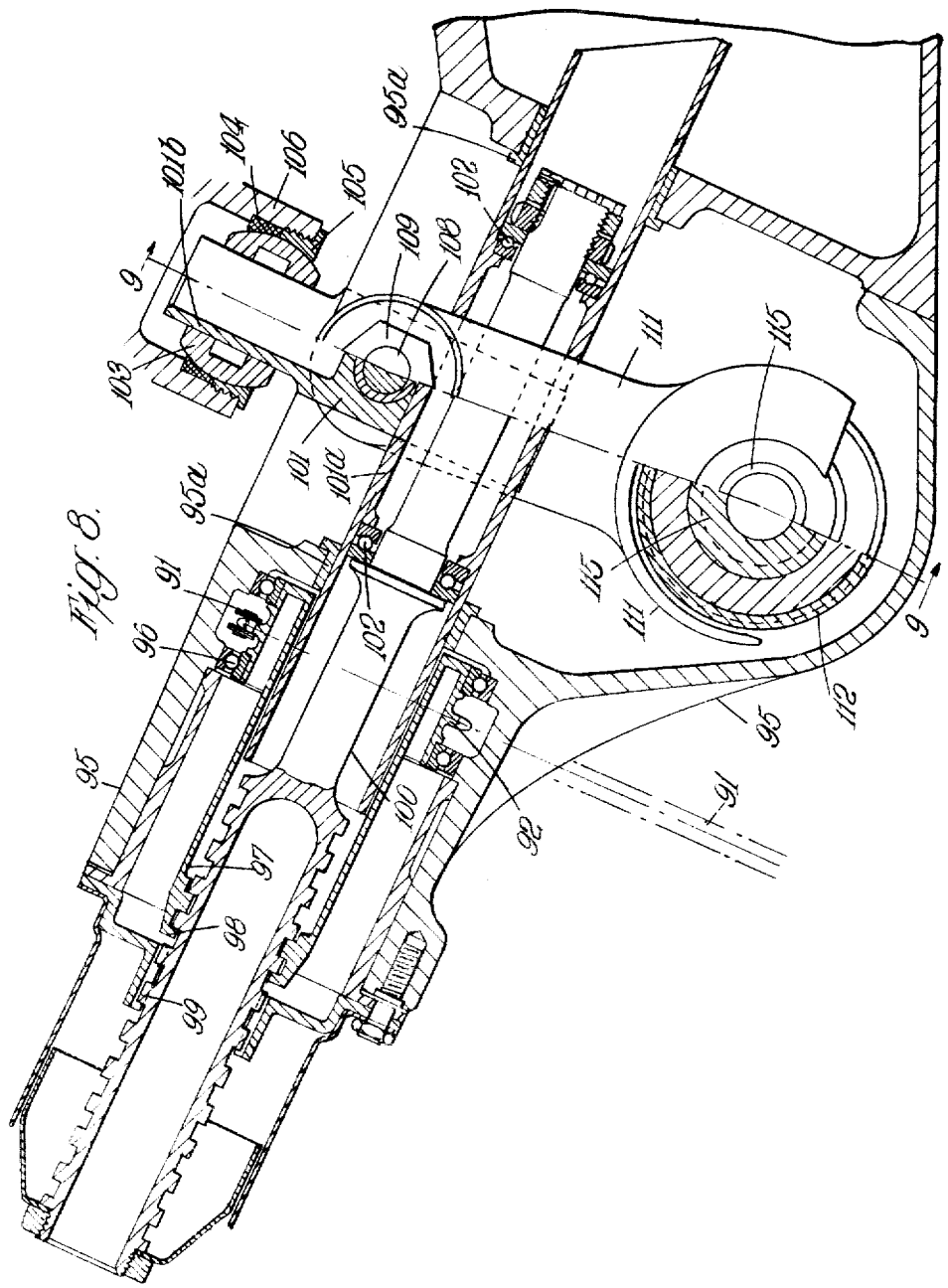

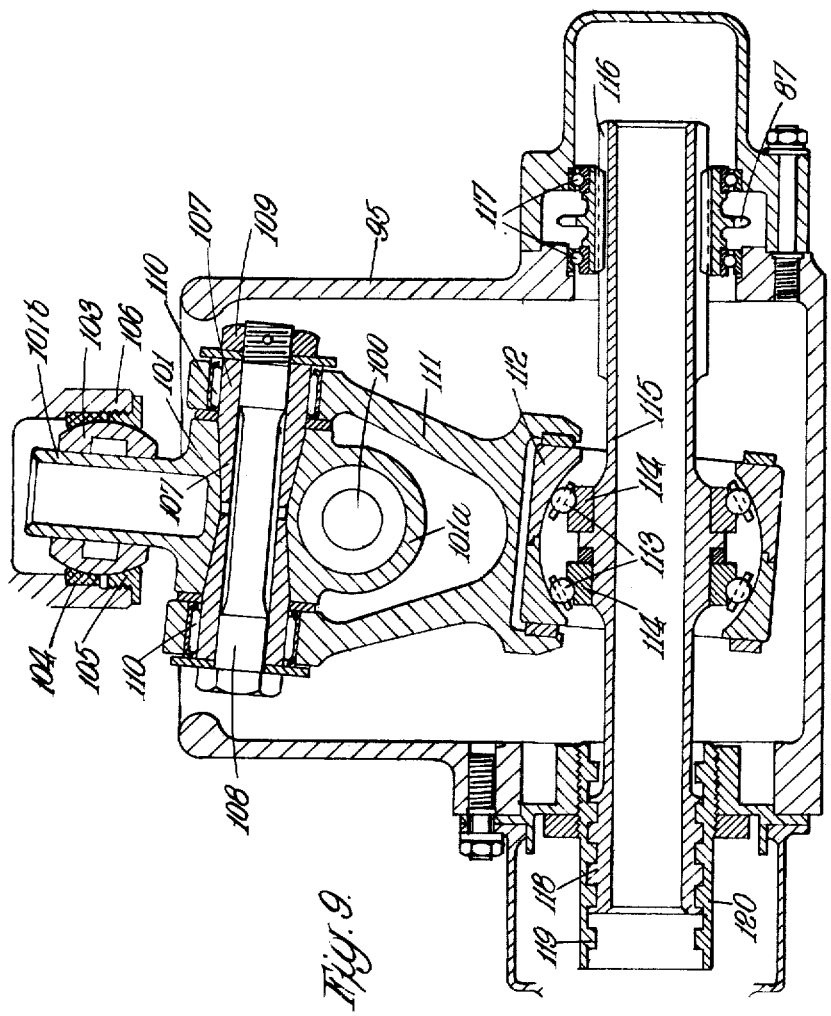

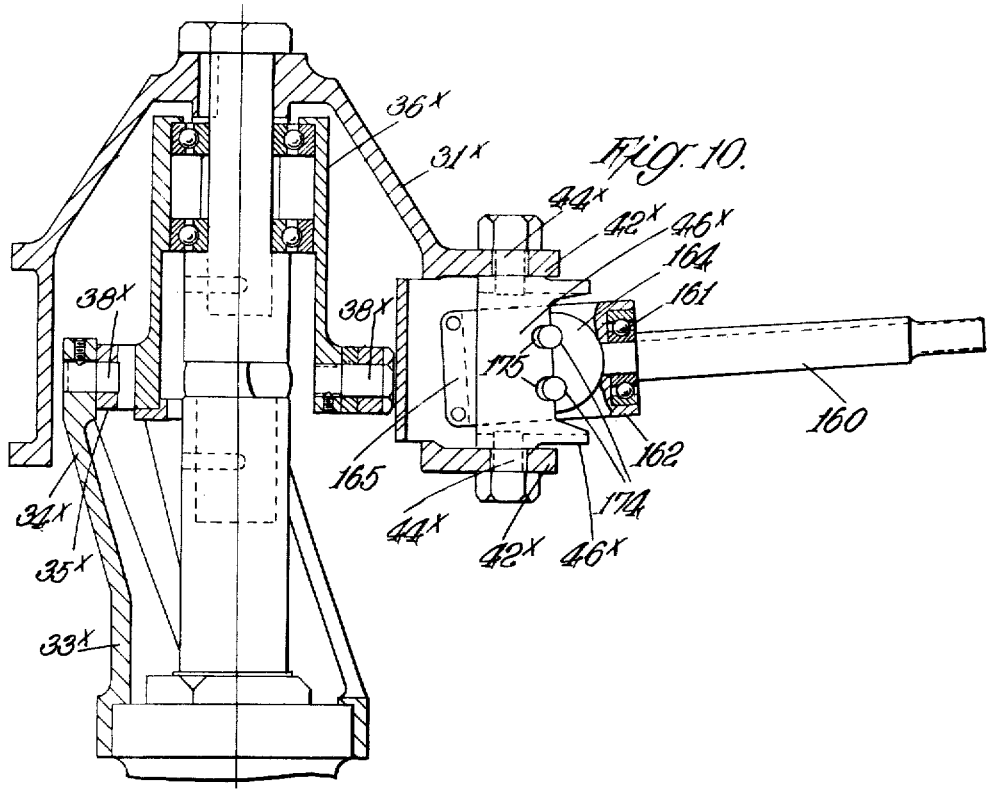
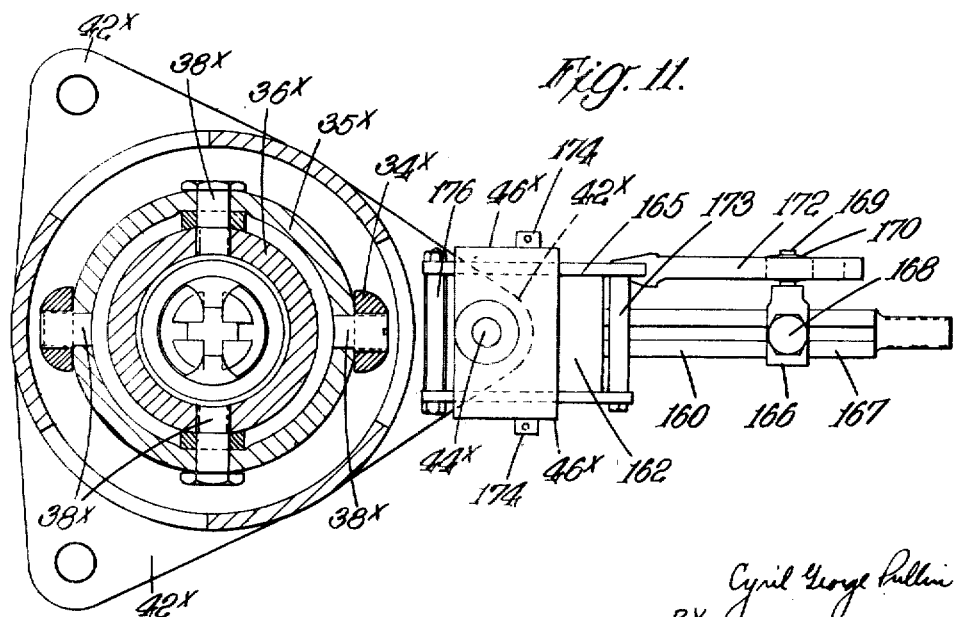

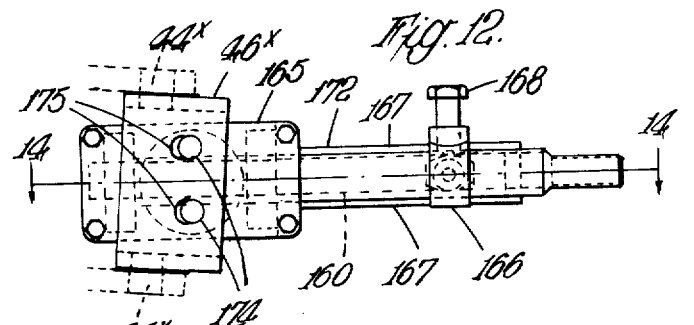
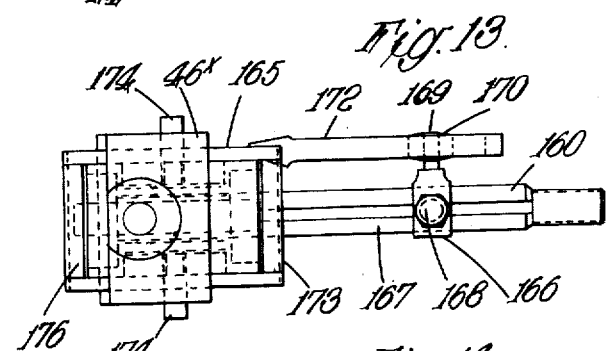
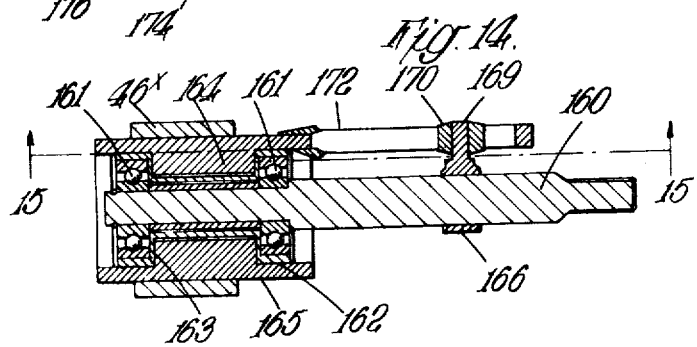
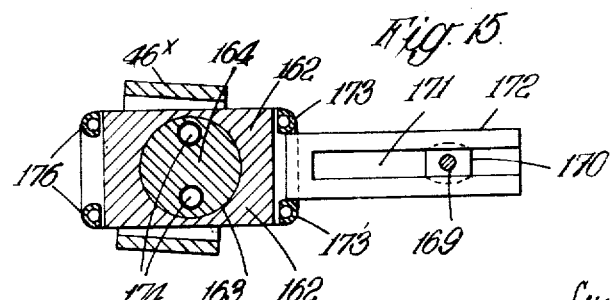

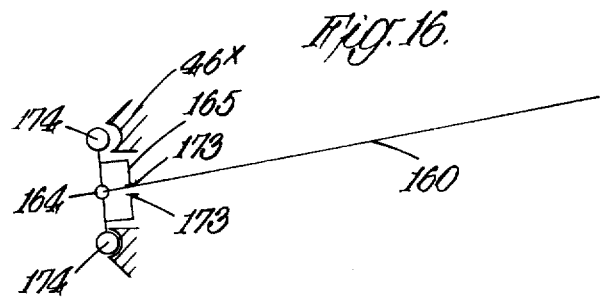
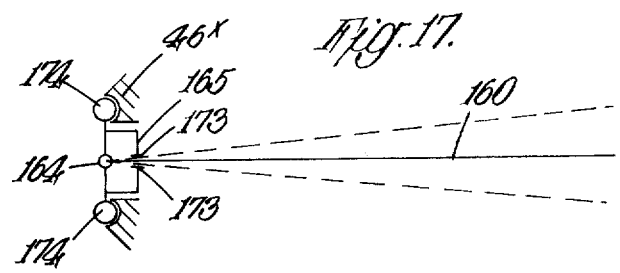
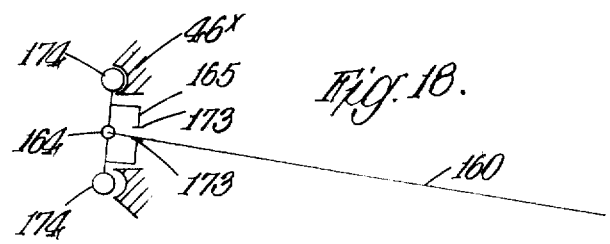

UNITED STATES PATENT OFFICE 2,509,313

HELICOPTER

Cyril George Pullin, Wimbledon, London, England, assignor to The Cierva Autogiro Company Limited, London, England, a British company Application May 20, 1944, Serial No. 536,548
In Great Britain May 18, 1943

Section 1, Public Law 690, August 8, 1946
Patent expires May 18, 1963

11 Claims. (Cl. 170—160.56)

This invention relates to helicopters having one or more torsional flapping rotors with stable characteristic, the last-named terms being defined as under:

"Torsional flapping rotor"=a lifting or/and sustaining rotor whose blades are independently pivoted to the hub for "flapping" in planes containing the blade axis and the rotational axis and in such a way (either by obliquity of the flapping pivot or by a system of compound pivots and suitable constraints) that the blade pitch angle varies with and is uniquely dependent on the flapping angle;

"Stable characteristic"=a torsional flapping rotor has a "stable characteristic" if the pitch angle decreases with upward flapping.

Two further terms, which will be hereinafter used, are defined as under:

"Tilting hub"=a rotor hub whose (non-rotative) axis member is connected to the airframe by means of a gimbal or universal joint;

"Direct control"=a system employing a connection between the axle member and the flying controls, whereby the position of the latter regulates the magnitude and direction of the inclination of the axle member from its neutral position.

I have found that advantages are to be gained in a helicopter having a torsional flapping rotor, especially in lightness of and response to the controls, by using a higher ratio of pitch change amplitude to flapping angle than hitherto has been usual, but this introduces additional problems.

If the said ratio is, for instance, 4 to 1, i. e. a flapping displacement of 1° gives rise to a pitch change of 4°, and the normal mean pitch angle of the blade is 12° and its stalling angle 20°, then a downward flapping displacement of more than 2° will increase the pitch angle to more than $(12+4 \times 2)°=20°$ and so stall the blade.

In a torsional flapping rotor with the above-mentioned pitch change/flapping ratio and with a tilting hub and direct control, a sudden control movement sufficient to tilt the hub through more than 2° from its previous position may cause stalling of the blades, because the first effect of a tilt of the hub is to cause a flapping oscillation of half-amplitude equal to the angular tilt applied; the inertia of the blades causing them to continue to rotate in their original path when the hub is first tilted. The mutual inclination of the axes of the hub and blade path can only be accommodated by a flapping oscillation, whose total amplitude is clearly twice as great as the said mutual inclination. This flapping oscillation brings into action unbalanced aerodynamic forces tending to restore the coaxiality of blade path and hub, and so to annul the flapping. However, except in vertical ascent or descent or hovering flight the equilibrium conditions require a steady flapping oscillation which increases with the ratio of translational to tip speeds of the blades, i. e. to $V/R\Omega$ (the symbols having their accepted conventional significations). Therefore, the most likely condition for stalling the blades arises when a control movement is suddenly applied in a direction such that the temporary flapping oscillation caused by the angular displacement of the hub is additive to the existing steady flapping oscillation. This will occur for instance when the controls are suddenly operated to put the aircraft, already in high speed level (forward) flight, into a dive. In such a case a control movement giving an initial tilt to the hub (from its previous position) of less than 2° may cause stalling of the blades.

Stalling of the blades can also occur as the result of encountering gusts of sufficient violence to cause a flapping oscillation whose half-amplitude exceeds 2° (the ratio of pitch change to flapping angle being 4 to 1 or more as above postulated); and blade stalling in these conditions, being dependent solely on the torsional flapping characteristic, is not confined to rotors having a directly controlled tilting hub.

The invention therefore is not limited to rotors with a directly controlled tilting hub but is applicable to any helicopter having a torsional flapping rotor, more especially to such as have a pronounced torsional flapping characteristic, i. e. in which the pitch increase for a given downward flapping angle is at least greater than 1.

A principal object of the invention is to achieve the advantage of large ratio of pitch change to flapping for small flapping displacements without incurring the disadvantage of stalling the blades, when the flapping angle exceeds a somewhat small limit in the downward direction.

Broadly, this object is achieved in the present invention by providing rotor blade mounting articulations which are characterised by a compound pivot arrangement incorporating limit stops, which confine the torsional-flapping characteristic (preferably of high pitch change/flapping ratio) to a limited range of flapping displacement, while permitting more extended flapping movements to occur without further change of pitch angle, or at least with much reduced degree of pitch change.

With such an arrangement downward flapping of the blade from its neutral position will be accompanied by increase of pitch angle in the predetermined ratio until a certain limit is reached, at which in normal conditions the actual incidence of the blade is still well below the stalling angle; further downward flapping displacement is not prevented, but it is not attended by any large increase of pitch angle, which remains constant (or nearly so) at or near its limiting (maximum) value. The arrangement is preferably such that similar conditions apply to upward flapping, principally because if it were not so, an unsymmetrical oscillation of pitch angle would occur whenever the amplitude of the flapping oscillation should exceed the value at which the pitch angle reaches its limiting value (either maximum or minimum). In other words, in order that symmetry of the pitch angle oscillation may be preserved, regardless of the amplitude of flapping oscillation, it is desirable that the range of flapping angles over which pronounced torsional-flapping characteristics obtain be symmetrically distributed about the neutral position of the blade corresponding to the mean coning angle averaged over all normally encountered flight conditions. In this connexion it can be shown that with a rotor having torsional-flapping characteristics whose pitch change/flapping angle ratio is large, i. e. ≮ unity, the coning angle is substantially constant for varying power input.

The more extended ranges of upward and downward flapping associated with constant or nearly constant pitch angle must have some limit set to them by mechanical stop means, but as these limits will be dictated by conditions irrelevant to the flapping oscillation, e. g. permissible droop angle at rest and prevention of a blade blowing right up in a wind when not rotating, there is no need for these limits to be symmetrically disposed about the neutral position of the blade; generally speaking, it will be convenient for the downward flapping angle to have a smaller ultimate limit than the upward flapping angle.

More particularly, the rotor blade-mounting articular assembly may comprise an articulation having relatively pronounced torsional-flapping characteristics, stops limiting movement on such articulation in either direction, and an additional flapping pivot or pivots giving no or very little pitch change with flapping and permitting greater range of flapping movement than the torsional-flapping articulation, the arrangement being such that movement on the auxiliary flapping pivot or pivots will only occur when the blade has reached one or other of the stops limiting movement on the torsional-flapping articulation.

One way of achieving the last-named condition is to utilise centrifugal force by offsetting the axes of the auxiliary flapping pivots, of which two are provided, above and below the blade axis, and providing means which ensure that upward flapping displacement must take place about the lower auxiliary pivot and vice versa: flapping about the auxiliary pivots is therefore always resisted by centrifugal force. The offsets are such that the centrifugal restoring moments about the auxiliary pivots are greater than that about the torsional-flapping articulation, so that flapping displacements within the range accommodated by the torsional-flapping articulation will be so accommodated without movement about the auxiliary pivots, which will only come into play for larger displacements.

Alternatively, the rotor blade-mounting articulation comprises a flapping pivot and a torsional pivot, stop means limiting blade movement about the torsional pivot but not about the flapping pivot and interconnecting elements including a yieldable device, incorporating a spring, ensuring that movement on the flapping pivot is accompanied by movement about the torsional pivot in the appropriate sense for giving a stable characteristic, until the limits imposed by the said stop means are reached, but capable of then yielding to allow more extended displacement (in either direction) about the flapping pivot (without further displacement about the torsional pivot).

In the foregoing statement and in what follows, the terms "torsional pivot" and "flapping pivot" are to be construed as meaning respectively "a pivot on which displacement is mainly torsional but may partake in a minor degree of flapping or/and lead/lag displacement," and "a pivot on which displacement is mainly flapping but may partake in a minor degree of torsional or lead/lag displacement."

If independent drag pivots allowing lead/lag displacements of the blades are provided, it is essential that they be located between the hub and the blade supporting member or between two components of the latter, so that drag displacements do not affect the pitch angle of the blades.

How the foregoing objects are attained, and others which will hereinafter appear, will be understood from the following description with reference to the accompanying drawings of two typical embodiments of the invention, the scope of which is defined in the appended claims.

In the drawings:

Figure 1 is a somewhat diagrammatic view in side elevation, partly in section, of a helicopter embodying the invention;

Figure 2 is a view in longitudinal vertical section of the rotor hub and attachments of one rotor blade;

Figure 3 is a view in section taken along the line 3—3 of Figure 2;

Figure 3a is a view in elevation of certain parts shown in Figure 3.

Figures 4, 4a and 5 are detail views in elevation of parts shown in Figure 3;

Figure 6 is a somewhat diagrammatic view in side elevation of the pilot's control connections;

Figure 7 is a diagrammatic view of the same in perspective;

Figure 8 is a view in longitudinal vertical section of the "control housing" (shown at 95 in Figure 6);

Figure 9 is a view in section taken along the line 9—9 of Figure 8;

Figure 10 is a somewhat diagrammatic representation in sectional elevation of the rotor hub and one rotor blade root of an alternative embodiment of the invention;

Figure 11 is part sectional plan view of the same (also somewhat diagrammatic);

Figures 12 to 15 are somewhat diagrammatic views of the blade articular mounting of the same, Figure 12 being in elevation, Figure 13 in plan, Figure 14 being in section taken along the line 14—14 of Figure 12 and Figure 15 in section taken along the line 15—15 of Figure 14;

Figures 16, 17 and 18 are entirely diagrammatic views in elevation indicating the limits of displacement of the blade about its articular mounting.

Referring to Figure 1, the helicopter includes a body 21, undercarriage elements 22, elevator 23, vertical fin 24 and rudder 25. Within the body is mounted the engine 26, which drives the rotor through gears contained in gear boxes 27, 29 and a transmission shaft 28. The final drive shaft is contained in a casing 30 forming an extension of the gear box 29.

The rotor hub is shown at 31 and the lifting rotor blades at 32.

Referring now to Figs. 2, 3, 4 and 5, the casing 30 of Figure 1 is extended upwardly by a hollow support member 33 terminating in a forked end 34 which supports a gimbal ring 35; this in turn supports a hollow axle member 36.

The gimbal ring 35 is provided with four equally spaced inwardly projecting bosses 37 carrying trunnions 38 provided with ball bearings 39. One pair of trunnions articulates with the ends of the supporting fork 34 and the other pair of trunnions with the axle member 36, on which the hub 31 is rotatably mounted by means of ball bearings 40, 41.

The rotor in this example has three blades, to support which the hub is provided with three pairs of ears 42 housing needle bearings 43, in which drag pivot pins 44 are rotatable. Drag links 46 are secured by taper pins 45 to the pins 44. Lead/lag displacements of the rotor blades are accommodated by movement of the drag links and pivot pins relatively to the hub ears 42.

Secured by taper pins 47 in the drag link 46 is a flapping pivot pin 48 and rotatably mounted thereon by means of needle bearings 49 is a blade root supporting link 50 on which the blade is rotatably mounted for torsional, i. e. pitch varying, displacement by means of a ball thrust bearing 52, a preload bearing 53 and a preload nut 54. The main spar of the blade (32) is shown at 55 and is screwed into a blade root housing 51 which is supported on the bearings 52, 53.

In order to obtain the stable torsional/flapping characteristic, the torsional and flapping displacements of the blade are made interdependent by means of a linkage comprising a lever 58 secured to the blade and an arm 61, 62, lying approximately parallel to the blade and on the leading side thereof, and secured to the flapping pivot pin. This construction is shown in Figures 3, 3a, 4 and 5.

A pair of lugs 56 integral with the spar 55 carries pivot studs 57 on which the lever 58, which is forked, articulates. The forward end of this lever carries studs 59 with spherical seatings which engage a ball 60 formed on the end of the arm part 61; the other end of the latter is tapered to fit in a taper socket of a boss 63 formed on the arm part 62, being secured by a nut 64. The inboard end of the arm part 62 is forked and the fork ends engage trunnions 65 formed on a collar 66, the further connections of which are as follows: Within the flapping pivot pin 48, which is hollow, is a loose sleeve 139 having a flanged end 140, which is secured by bolts 67 to the collar 66 and to a cam plate 141 having face cams 142 engaging corresponding face cams formed in the adjacent end of the flapping pivot pin 48. These cams are shown in elevation in Figure 3a. The weather shield, shown in cross-section in Figure 3, has been omitted from Figure 3a, so as to expose the parts usually protected by it. The cams are held in engagement by the pressure of a spring 144 which abuts on an internal shoulder 143 of the sleeve 139 the other end of the spring being retained by the head 145 of a rod 146 whose other end is secured by a pin 147 to a cap 148, which retains a stop collar 150. The latter is slidably, but non-rotatably, mounted on the sleeve 139, which is splined at 149 to engage corresponding splines of a sleeve extension of the stop collar 150; said sleeve extension is rotatable in the bore of the flapping pivot pin 48.

Referring to Figure 4a, the stop collar 150 has two slots 151 in its circumference which engage stop lugs 152 formed integrally on the rear face of the blade-supporting link 50. A clearance is established between the stop lugs 152 and ends of the slots 151, allowing a predetermined amount of relative movement.

This arrangement operates as follows:

When the blade is in its mean position, as regards flapping, i. e. there is no flapping, the collar 66 carrying the arm 61, 62, is locked to the flapping pivot pin, by the action of spring 144 holding the cam faces 142 in engagement. For small amplitudes of flapping this condition also holds good; the outboard-end 60 of the arm 61, 62 being stationary, the lever 58 operates to rotate the blade about the axis of the torsional pivot 50, 52, 54, 51, in the direction to decrease the blade pitch angle with upward flapping, thus giving a stable torsional/flapping characteristic.

But when the amplitude of flapping is great enough for the clearance between either end of the slots 151 and the stop lugs 152 to be taken up, any further increase of flapping amplitude causes the stop collar 150 to rotate with the blade-supporting link 50 about the flapping pivot pin 48, and with it the sleeve 139, collar 66 and arm 61, 62, the spring 144 yielding sufficiently to allow the cam faces 142 to ride over one another. In such further flapping displacement, therefore, the arm 61, 62 follows the blade and no further displacement of the blade about the torsional pivot axis takes place. The stop collar 150 and stop lugs 152 thus serve to limit the amplitude over which the torsional/flapping characteristic obtains and are preferably so set that the positive and negative limits of pitch angle variation (from the mean value) are equal and within the limits required to prevent stalling of the blades. The actual values of these limits depend on the ratio of pitch change to flapping angle, which is approximately equal to the ratio of lengths of the lever 58 and the arm 61, 62. In the example illustrated this ratio is about 5/3, but may be varied by the use of interchangeable arm parts 62, 63 of different lengths as indicated in chain dotted lines.

Limitation of upward and downward flapping is provided by means of a stop plate 68, formed integrally with the drag link 46 and having upper and lower faces 69, 70 which engage the inner surface 71 of the blade-supporting link 50.

The amplitude limits of flapping imposed by this stop device are much larger than the amplitude limits of torsional flapping imposed by the stop collar 150 and stop lugs 152 and are not necessarily equal for upward and downward flapping. They are dictated principally by the permissible upward flapping angle to prevent damage to the mechanism in gusts when the rotor is not rotating and the permissible droop angle of the blades at rest: The upward limit will in general be greater than the downward limit.

Referring now to Figures 6 to 9, showing the control mechanism of the tilting hub, the pilot's seat is indicated at 72. In the conventional position is a control column 73 pivoted at 74 to a crank 75 integral with a rocking shaft 76 supported in a bearing 77 and carrying a sprocket 78. The control column is also pivoted at 79 to a push-pull rod 80 actuating a crank 81 carrying a sprocket 82.

A chain or cable 83 is passed over sprocket 78 and over another sprocket 84 which is fast on a further sprocket 85.

Similarly a chain or cable 88 connects sprocket 82 with a sprocket 89 fast on yet another sprocket 90. Sprockets 84, 85, 89, 90 are coaxial as shown in Figure 6, but for convenience in following the run of the controls the pairs of sprockets 84, 85 and 89, 90 respectively are shown in Figure 7 with their axes separated.

Sprocket 85 carries a chain or cable 86 which is also passed over a sprocket 87 within a control housing 95, while another sprocket 92 within this housing (see Figure 8) is actuated by a chain or cable 91 which is passed over sprocket 90.

The chains or cables 86, 91 are also passed over four jockey pulleys 93 (indicated diagrammatically in Figure 7 by a bar 93x).

Referring now to Figures 8 and 9, the control housing 95 is secured to the upper end of the casing 30 enclosing the final rotor drive shaft (see also Figure 6). The sprocket 92 is mounted in this housing on bearings 96 and is integral with a sleeve 97 having a quick pitch female thread 98 formed therein. This thread engages a corresponding male thread 99 formed on a bar 100 on which a sleeve portion 101a integral with a link member 101 is rotatably but not slidably mounted by means of bearings 102. The sleeve portion 101a is slidably mounted in the housing 95 by means of bushes 95a.

The link member also carries a divided pivot pin 107, secured by means of a through-bolt 108 and nut 109, and having rotatably mounted thereon, by means of bearings 110, a forked link 111 whose other end carries a spherical race 112 enclosing two cages of balls 113 running on races 114 carried by a cross-shaft 115 which is free to slide endways and to rotate. One end of shaft 115 has splines 116 engaging corresponding splines of the sprocket 87, which is rotatably mounted in the housing 95 by means of bearings 117. The other end of shaft 115 has a male quick pitch thread 118 engaging a corresponding female thread 119 in a sleeve 120 secured in the casing 95.

The link member 101 also has formed thereon a spigot 101b carrying a male spherical element 103 engaging spherical seatings formed in a collar 104 and a nut 105 secured to the socket end 106 of a lever 94 which is integral with the rotor axle member 36 (see Figures 2 and 6). (It will be remembered that the axle member 36 is supported on the gimbal mounting 34, 35 and has the hub 31 rotatably mounted on it.)

Fore and aft movement of the control column causes the sprocket 92 to rotate by means of the operation of the intermediate elements 80, 81, 82, 83, 89, 90, 91 and the thread elements 98, 99 cause the bar 100 to move axially carrying with it the link member 101, 101a, 101b, which thereby actuates the lever 94, 106 to tilt the axle member 36 and with it the hub 31 in the fore and aft plane.

Similarly, transverse movement of the control column acting through the intermediate elements 75, 76, 78, 83, 84, 85, 86 rotates the sprocket 87 and shaft 115, which latter is caused by the thread elements 118, 119 also to slide endways and this moves the forked link 111 to rock the link member 101, 101a, 101b transversely on its bearings 102 and this in turn actuates the lever 94, 106 to tilt the axle member 36 and with it the hub 31 in the transverse plane.

The hub 31 is driven by a final drive shaft 121 through a universal joint 122, 126, a driven stud shaft 127, a splined joint 134, a driving plate 135 and a freewheel coupling 136. The details of this driving mechanism will not be further described as they form no part of the present invention.

An alternative construction for attaining the principal object of the invention, viz. the limitation of torsional/flapping characteristic to a small amplitude of blade displacement, while permitting more extended flapping displacement without further torsional displacement, is illustrated somewhat diagrammatically in Figures 10 to 15.

It must be understood that these figures are in no sense to be regarded as working drawings, but merely as illustrative of the functional relationships called for.

In these drawings parts strictly analogous to those already shown in Figures 2 to 5 and described with reference thereto are indicated by the same reference numbers but with the suffix $x$. Thus in Figures 10 and 11, a rotor supporting member $33x$, $34x$ carries a gimbal ring $35x$, which in turn supports the rotor axle member $36x$, the gimbal ring being articulated to the members $34x$, $35x$ on trunnions $38x$. The axle member $36x$ rotatably supports the rotor hub $31x$, which is provided with ears $42x$ carrying drag pivot pins $44x$, on which a drag link $46x$ is rotatable for lead/lag displacement of the rotor blade.

The root end of the latter is indicated at 160 and is rotatable about its axis, for blade pitch varying displacement, on bearings 161 carried by a housing 162 (see also Figures 14, 15). The housing 162 has circular recesses 163 constituting bearings engaging inwardly projecting journal bosses 164 formed on side plates 165 interconnected by cross bars 173, 176 to form a cage member. The articulation 163, 164 constitutes the primary flapping pivot.

The torsional/flapping characteristic is obtained by means of a collar 166 embracing the blade root 160 and engaging splines 167 thereon which lock the collar against rotation, but permit it to be shifted along the blade root for adjusting the ratio of pitch change to flapping: a stud 168 secures the collar 166 in the desired position. The collar 166 carries a spigot 169 carrying (rotatably) a bead 170 engaging a slot 171 in an arm 172 secured to cage member 165, 173, 176. Arm 172 lies on the leading side of the blade and hence upward flapping of the blade on the articulation 163, 164 causes decrease of pitch angle in the same way as the similar mechanism already described with reference to Figures 2 to 5. The torsional/flapping displacement is limited by the blade root 160 engaging the upper or the lower of the cross bars 173.

More extended flapping without torsional characteristic is accommodated by a "lever articulation" comprising two pairs of fulcrum pins 174 projecting from the side plates 165 of the cage member 165, 173, 176, the pairs of fulcrum pins being located respectively above and below the axis of the blade and engaging elongated slots 175 formed in the drag link $46x$.

As long as flapping does not exceed the amplitude permitted by the stop bars 173, it takes place entirely about the articulation 163, 164 because the centrifugal force of the blade holds both pairs of fulcrum pins against the outboard ends of slots 175, but any further flapping is accommodated by rocking of the cage 165, 173, 176 on either the lower or upper pair of fulcra 174, 175, according as the flapping is upward or downward, and such further flapping is resisted by a considerable centrifugal moment. It is not accommodated by any further torsional displacement of the blade, because the cage member 165, 173, 176 to which the arm 172 is secured now participates in the flapping and the arm 172 therefore follows the blade and has no further action on the torsion lever 166, 169.

The more extended flapping displacement is finally limited by the length of the slots 175, which defines the possible travel of the fulcrum pins 174.

The two modes of flapping displacement are illustrated diagrammatically in Figures 16 to 18, in which no attempt has been made to give the parts (indicated by reference numbers corresponding to those of Figures 10 to 15) their proper shape, but merely their relative positions.

Figure 17 shows the mean position of the blade in full line and the limits of upward and downward flapping (with torsional displacement), on the primary flapping articulation, in dotted lines. Figures 16 and 18 show respectively the ultimate limiting positions for upward and downward flapping in which the "lever articulation" is involved.

What I claim is:

1. In an aircraft having a hub, a rotative sustaining blade, and articulated means connecting the blade to the hub including torsional pivot means and flapping pivot means, the combination which includes: a lever mounted to react between the blade and the articulated means in a limited range of blade movement to alter the pitch of the blade when the blade moves in the flapping plane relative to said lever means, and pitch limit stop means forming a part of the articulated means and positioned to be actuated by movement of the blade beyond said limited range of movement, said stop means being connected to said lever to constrain the latter to move simultaneously with the former.

2. In a helicopter including a rotor hub, a lifting rotor blade, and articular means connecting the blade to the hub including pivotal means about which pitch-changing movement and flapping movement of the blade take place, the combination which includes means reacting between the blade and the articular means to cause pitch-changing movement of the blade simultaneously with flapping movement of the blade within a predetermined range of such flapping movement, and means effective to impose a restraint upon the operation of said pitch-changing means when flapping movement exceeds said predetermined range, said last named means incorporating a lost-motion connection between the articular means and the pitch-changing means accommodating pitch-changing movement within said predetermined range.

3. A device as set forth in claim 2, in which the means effective to impose a restraint comprises fulcrum means positioned to be selectively operated upon movement of the blade beyond the predetermined range of flapping movement.

4. In a helicopter including a rotor hub and a lifting rotor blade, articular means connecting the blade to the hub comprising an intermediate blade supporting member, pivot means connecting the supporting member to the hub and permitting movement of the blade substantially in the flapping plane containing the radial blade axis and the hub axis, pivot means connecting the blade to the supporting member and permitting torsional movement of the blade about its radial axis, stop means on the supporting member limiting torsional movement of the blade from its mean position, linkage reacting between the blade and a portion of the articular means and ensuring coordinated flapping displacement of the blade and supporting member about the first named pivot means and torsional displacement of the blade on the supporting member about the second named pivot means in the sense that upward flapping is accompanied by decrease in pitch angle, within the limits of torsional displacement imposed by the said stop means; and yieldable means interconnecting said first-named pivot means and said linkage and accommodating flapping displacement beyond said limits without further torsional displacement of the blade.

5. In a helicopter including a rotor hub and a lifting rotor blade, articular means connecting the blade to the hub comprising an intermediate blade supporting member, pivot mechanism connecting the blade to the supporting member and accommodating flapping and torsional displacements of the blade, a supplemental connection between said blade and a part of the pivot mechanism about which flapping displacements of the blade take place, said connection being mounted to cause torsional displacement of the blade in a sense to decrease pitch angle on upward flapping and vice versa, stop means forming a part of said pivot mechanism, positioned to limit the range of blade displacement in a flapping sense relative to said supplemental connection, and pivotal means connecting the supporting member to the hub and providing for greater displacement of the blade substantially in the flapping plane containing the radial blade axis and the rotor hub axis, said last named pivotal means having a yieldable coupling locking the supporting member and the hub against relative movement thereon by the action of centrifugal force transmitted from the blade except when the blade has reached either limit of displacement, about the first named pivot means, imposed by the said stop means.

6. In a helicopter including a rotor hub, a lifting rotor blade, and articular means connecting the blade to the hub including pivotal means about which pitch-changing movement and flapping movement of the blade take place, the combination which includes an auxiliary connection between the blade and the articular means, mounted to move with the blade through a substantial portion of the path of flapping movement, and a lost-motion device interposed between said connection and said articular means providing relative movement between blade and connection within the limits of such lost-motion, the blade and the connection being interconnected to effect an alteration in pitch angle of the latter only when relative movement between blade and connection occurs.

7. A helicopter as claimed in claim 5, wherein the last named pivotal means include two pivots with parallel axes lying respectively above and below the mean radial axis of the blade, abutments for said pivots so placed as to resist the centrifugal force transmitted from the blade and clearances permitting separation of said pivots from their abutments at least to a limited extent.

8. A helicopter as claimed in claim 4, wherein the mentioned restraining means comprise a lever secured to the blade and extending forwardly therefrom in the direction of rotation of the blade, an arm disposed substantially parallel to the blade and having its outboard end universally jointed to the forward end of said lever, the inboard end of said arm being rotatably mounted about the axis of the first named pivot means and the mentioned yieldable means comprise spring-loaded clutch means interposed between the inboard end of said arm and the hub, whereby the arm is locked to the hub as long as the blade is free to move on the second named pivot means relatively to the supporting member but, on the blade reaching either of the stop means limiting movement on said second named pivot means, yielding of the spring loading takes place allowing the clutch means to slip, thereby rendering the torsional-flapping restraining means inoperative, so that greater displacement of the blade and supporting member about the first named pivot means can take place without further displacement on the second named torsional pivot means, such displacement being prevented by the stop means.

9. In a helicopter as claimed in claim 4, the inclusion of a second intermediate member articulated to the hub by a "drag" pivot, permitting lead and lag displacement of the blade, the first mentioned intermediate blade supporting member being connected to the last named intermediate member by the first named pivot means.

10. In a helicopter as claimed in claim 5, the inclusion of a second intermediate member articulated to the hub by a "drag" pivot, permitting lead and lag displacement of the blade, the first mentioned intermediate blade supporting member being connected to the last named intermediate member by the second named pivotal means of claim 5.

11. In a helicopter including a rotor hub, a lifting rotor blade, and articular means connecting the blade to the hub including pivotal means about which pitch-changing movement and flapping movement of the blade takes place, the combination which includes means reacting between the blade and the articular means to cause pitch-changing movement of the blade simultaneously with flapping movement of the blade within a predetermined range of such flapping movement, and means effective to impose a restraint upon the operation of said pitch-changing means when flapping movement exceeds said predetermined range, said restraint imposing means comprising cam structures mounted in fixed relation to the blade means and to the hub means, respectively, and a yieldable connection between said cam structures.

CYRIL GEORGE PULLIN.

REFERENCES CITED

The following references are of record in the file of this patent:

UNITED STATES PATENTS

| Number | Name | Date |
|---|---|---|
| 1,948,457 | Larsen | Feb. 20, 1934 |
| 1,950,080 | De La Cierva | Mar. 6, 1934 |
| 1,971,016 | Pecker | Aug. 21, 1934 |
| 2,108,417 | Stanley | Feb. 15, 1938 |
| 2,318,259 | Sikorsky | May 4, 1943 |
| 2,330,842 | Pullin | Oct. 5, 1943 |
| 2,365,357 | Prewitt | Dec. 19, 1944 |
| 2,380,582 | De La Cierva | July 31, 1945 |

FOREIGN PATENTS

| Number | Country | Date |
|---|---|---|
| 476,596 | Great Britain | Dec. 13, 1937 |